United States Patent
Kozaki

(10) Patent No.: US 7,525,784 B2
(45) Date of Patent: Apr. 28, 2009

(54) MAGNETIC BEARING DEVICE

(75) Inventor: Junichiro Kozaki, Kyoto (JP)

(73) Assignee: Shimadzu Corporation, Kyoto-shi, Kyoto (JP)

( * ) Notice: Subject to any disclaimer, the term of this patent is extended or adjusted under 35 U.S.C. 154(b) by 392 days.

(21) Appl. No.: 11/606,016

(22) Filed: Nov. 30, 2006

(65) Prior Publication Data

US 2007/0069598 A1    Mar. 29, 2007

(51) Int. Cl.
*H01H 47/00* (2006.01)
(52) U.S. Cl. ........................ 361/139; 361/143
(58) Field of Classification Search ............ 361/139, 361/143, 144; 310/90.5
See application file for complete search history.

(56) References Cited

U.S. PATENT DOCUMENTS 6,515,388 B1 * 2/2003 Moriyama et al. ......... 310/90.5

* cited by examiner

*Primary Examiner*—Danny Nguyen
(74) *Attorney, Agent, or Firm*—Manabu Kanesaka

(57) ABSTRACT

An electromagnet configured to contactlessly support a body includes an excitation amplifier configured to supply excitation current to the electromagnet, a carrier wave generation device, and a sensor configured to modulate the carrier wave and to output a sensor signal. An A/D conversion device is included for converting the sensor signal to a digital signal at a sampling frequency such that the frequency range of the sensor signal is either higher than 1/2 times the sampling frequency and lower than the sampling frequency, or higher than the sampling frequency and lower than 3/2 times the sampling frequency. In addition, a demodulation calculation device for demodulating the digitized sensor signal and a control device for controlling the excitation amplifier are provided.

6 Claims, 11 Drawing Sheets

MAGNETIC BEARING DEVICE

BACKGROUND OF THE INVENTION AND RELATED ART STATEMENT

The present invention relates to a magnetic bearing device used in a turbo-molecular pump, a machine tool, or the like.

Magnetic bearing devices are often used as bearings in turbo-molecular pumps, machine tools, or the like, which require high-speed rotation with low vibration. In the case of a rotating body, a five-axis control type magnetic bearing is generally used. In a five-axis control type, four-axis control is performed in the radial direction and one-axis control is performed in the axial direction. Each axis is provided with a displacement sensor for detecting displacement between the magnet and the rotating body, and an inductance type sensor is often used for the displacement sensor. Usually, an opposed type is used on the radial axis and a non-opposed type is used on the axial axis.

A carrier wave is applied to the displacement sensor, and the carrier wave is amplitude modulated by change of impedance of the sensor part due to change of gap with the rotating body. Also, the excitation current of the electromagnetic is controlled by using a displacement signal obtained by demodulating this amplitude modulated signal (for example, see Japanese Unexamined Patent Publication No. H6-313426).

In the case of the displacement sensor on the axial axis, because it is not opposed type, the offset value of the sensor signal changes according to a change of the floating capacitance of the sensor part or the signal line. In particular, when the cable connecting the magnetic bearing device and the controller is changed, the offset value tends to change greatly according to the change of floating capacitance of the cable. Accordingly, it was necessary to perform offset adjustment each time it is change. Therefore, in order to be able to eliminate the task of offset adjustment, the frequency of the carrier wave tends to be set low.

However, in case that the frequency of the carrier wave was set low, when removing the base wave of the carrier wave and the higher harmonics from the amplitude modulated wave in order to filter the sensor signal, the frequency of the carrier wave becomes relatively close to the required band of the sensor signal. Therefore, in order that the magnetic levitation controllability not be lowered, it was necessary to avoid phase delay of the required band to the greatest extent possible, and with regard to filtering, it was necessary to use a large number of notch filters instead of a low-pass filter. As a result, there was a drawback that it led to increase of circuit size.

The present invention has been made to avoid drawbacks of the conventional apparatus.

Further objects and advantages of the invention will be apparent from the following description of the invention.

SUMMARY OF THE INVENTION

The magnetic bearing device according to the invention of the first aspect comprises: an electromagnet for contactlessly supporting a supported body; an excitation amplifier for supplying excitation current to the electromagnet; a carrier wave generation means for generating a carrier wave; a sensor for modulating the carrier wave according to a floating position of the supported body and outputting a sensor signal; an A/D conversion means for converting the sensor signal to a digital value at a sampling frequency such that the frequency band of the sensor signal becomes higher than 1/2 times the sampling frequency and lower than the sampling frequency, or at a sampling frequency such that the frequency band of the sensor signal becomes higher than the sampling frequency and lower than 3/2 times the sampling frequency; a demodulation calculation means for demodulating by digital calculation processing based on the sensor signal converted to a digital value; and a control means for controlling the excitation amplifier based on the calculation result of the demodulation calculation means.

The invention of the second aspect is the magnetic bearing device recited in the first aspect, wherein the sampling frequency is set to 4/3 times or 4/5 times the frequency of the carrier wave.

The invention of the third aspect is the magnetic bearing device recited in the first or second aspects, wherein the demodulation calculation means has a sine wave discrete value generation part for generating a sine wave discrete value by digital calculation processing, a multiplication part for multiplying the sensor signal converted to a digital value and the sine wave discrete value, and a low-pass calculation part for performing low-pass calculation processing on the multiplication result of the multiplication part. The carrier wave generation means comprises a phase shift calculation part for phase shifting the sine wave discrete value by digital calculation processing such that the sine wave discrete value multiplied by the multiplication part and the sensor signal converted to a digital value become virtually/substantially the same phase, and a D/A conversion part for D/A converting that phase shifted sine wave discrete value to generate the carrier wave. In addition, the control means controls the excitation amplifier based on the calculation result of the low-pass calculation part.

A forth aspect includes the magnetic bearing device recited in the first or second aspect, wherein the carrier wave generation means comprises a sine wave discrete value generation part for generating a sine wave discrete value by digital calculation processing, and a D/A conversion part for D/A converting the sine wave discrete value to generate the carrier wave. The demodulation calculation means comprises a phase shift calculation part for phase shifting the sine wave discrete value by digital calculation processing such that the sine wave discrete value and the sensor signal converted to said digital value become substantially the same phase, a multiplication part for multiplying the sine wave discrete value phase shifted by the phase shift calculation part and the sensor signal converted to a digital value, and a low-pass calculation part for performing low-pass calculation processing on the multiplication result of the multiplication part. The control means controls the excitation amplifier based on the calculation result of the low-pass calculation part.

According to the present invention, by making the sampling frequency when digitally converting the sensor signal as a frequency 4/3 times or 4/5 times the carrier frequency, sampling is possible without being subject to the influence of aliasing, and furthermore, the size of digital calculation processing can be made smaller.

DETAILED DESCRIPTION OF THE EMBODIMENTS

Figure 1:
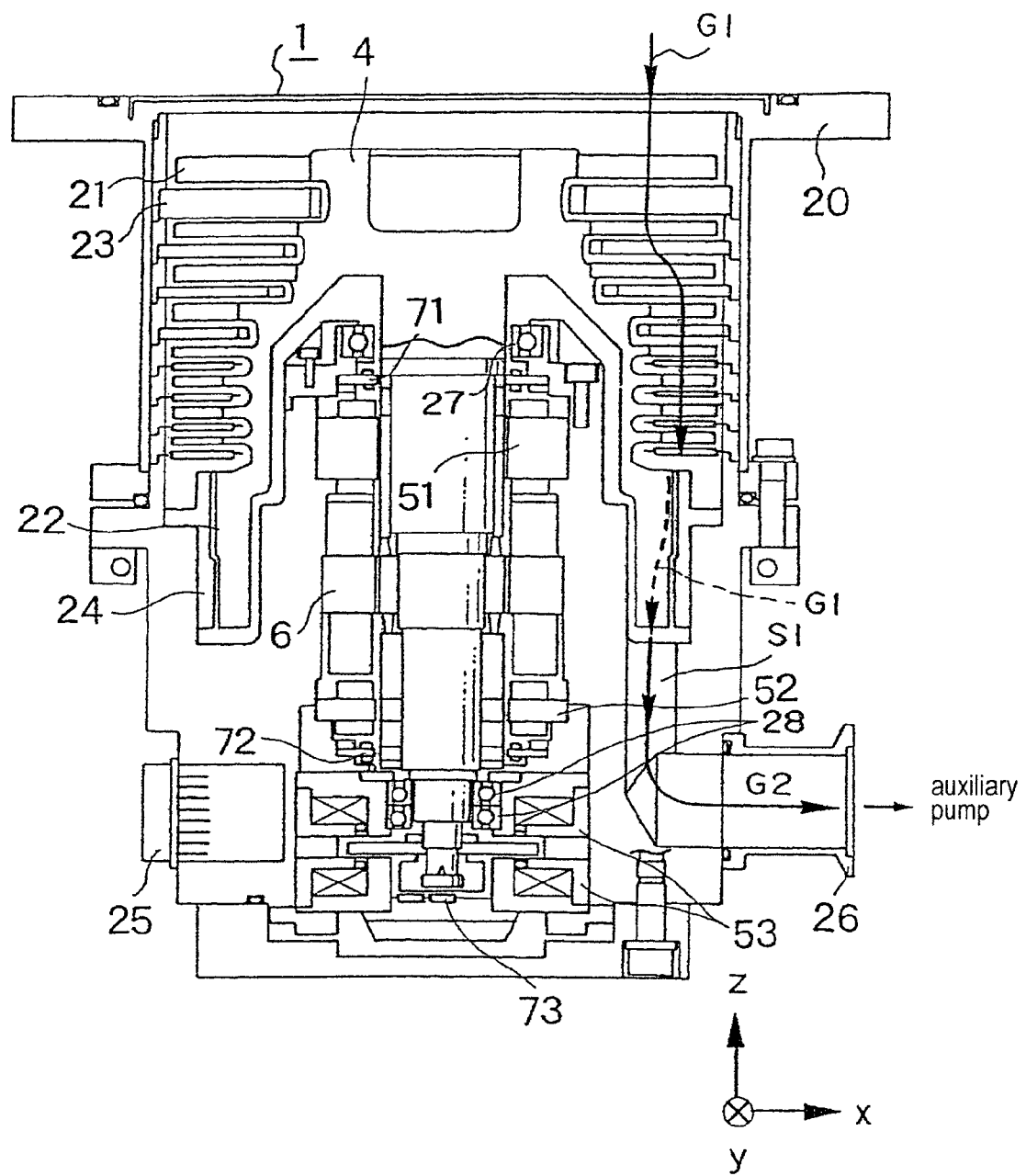
FIG. 1 illustrates a first embodiment of a magnetic bearing device according to the present invention, and is a sectional view showing the generalized configuration of a magnetic bearing type turbo-molecular pump.

Below, preferred embodiments for implementing the present invention are explained while referring to the drawings.

FIG. 1 illustrates a first embodiment of a magnetic bearing device according to the present invention, and it is a sectional view showing the generalized configuration of a magnetic bearing type turbo-molecular pump. Inside a casing 20 provided on a pump main body 1, there are provided: a rotor 4 having formed plural stages of rotor blades 21 and a screw groove part 22; stator blades 23 disposed alternately with the rotor blades 21; and a cylindrical member 24 disposed opposite the above screw groove part 22. Electromagnets 5 for contactlessly supporting the rotor 4 include electromagnets 51 and 52 constituting radial magnetic bearings, and an electromagnet 53 constituting an axial magnetic bearing. The aforementioned elements constitute a five-axis control type magnetic bearing.

Radial displacement sensors 71 and 72 and an axial displacement sensor 73 are provided corresponding with these radial electromagnets 51 and 52 and axial electromagnet 53. A cable for connecting the pump main body 1 and a controller (not illustrated) is connected to a receptacle 25, and the pump main body 1 is driven and controlled by that controller. When the rotor 4 is driven to rotate by a motor 6, while being contactlessly supported by the electromagnets 51, 52 and 53, gas on the side of a gas inlet flange 20 is exhausted to the back pressure side (space S1) as shown by arrow G1. The gas exhausted to the back pressure side is discharged to the outside by an auxiliary pump connected to a gas outlet flange 26.

Bearings 27 and 28 are emergency mechanical bearings for supporting rotor 4 when the rotor 4 is not magnetically levitating. The bearing 27 constrains the movement of two axes (x axis and y axis) in the radial direction of the rotor 4 during emergencies, and the bearing 28 constrains two axes (x axis and y axis) in the radial direction and one axis (z axis) in the thrust direction.

Figure 2:
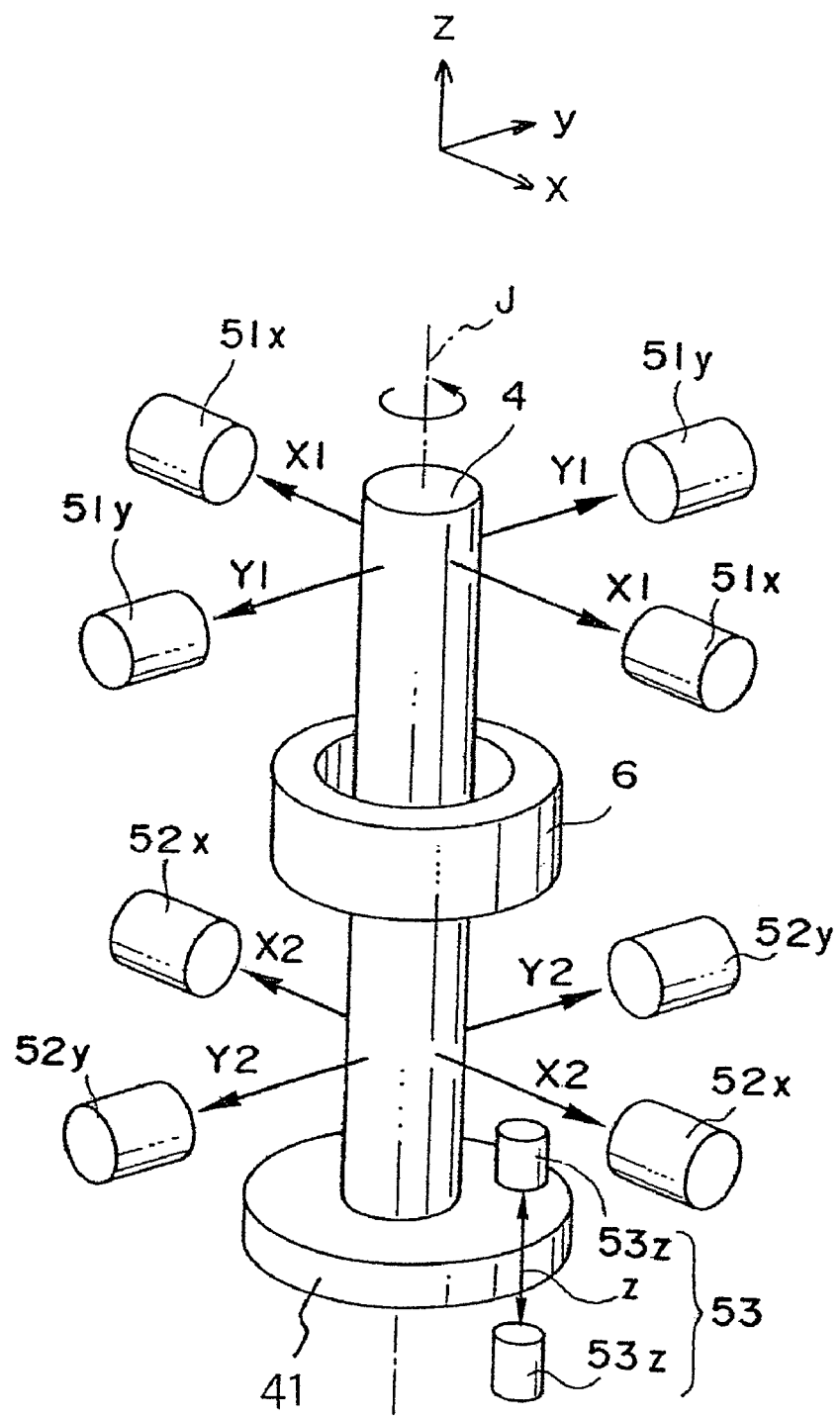
FIG. 2 is a concept diagram of a five-axis control type magnetic bearing.

FIG. 2 illustrates a five-axis control type magnetic bearing wherein the rotational axis J of the rotor 4 is shown as aligned with the z axis. The radial electromagnet 51 shown in FIG. 1 comprises a pair of electromagnets 51x relative to the x axis and a pair of electromagnets 51y relative to the y axis. Likewise, the radial electromagnet 52 also comprises a pair of electromagnets 52x relative to the x axis and a pair of electromagnets 52y relative to the y axis. Also, the axial electromagnet 53 comprises a pair of electromagnets 53z disposed oppositely so as to sandwich a disk 41 provided on the lower end of the rotor 4 along the z axis. In addition, FIG. 1 illustrates displacement sensors 71 and 72 constituted by respective pairs of radial displacement sensors corresponding to the electromagnets 51x, 51y, 52x and 52y. Accordingly, the five-axis control type magnetic bearing is constituted by these five groups of electromagnets 51x, 51y, 52x, 52y, 53, and displacement sensors 71~73.

Figure 3:
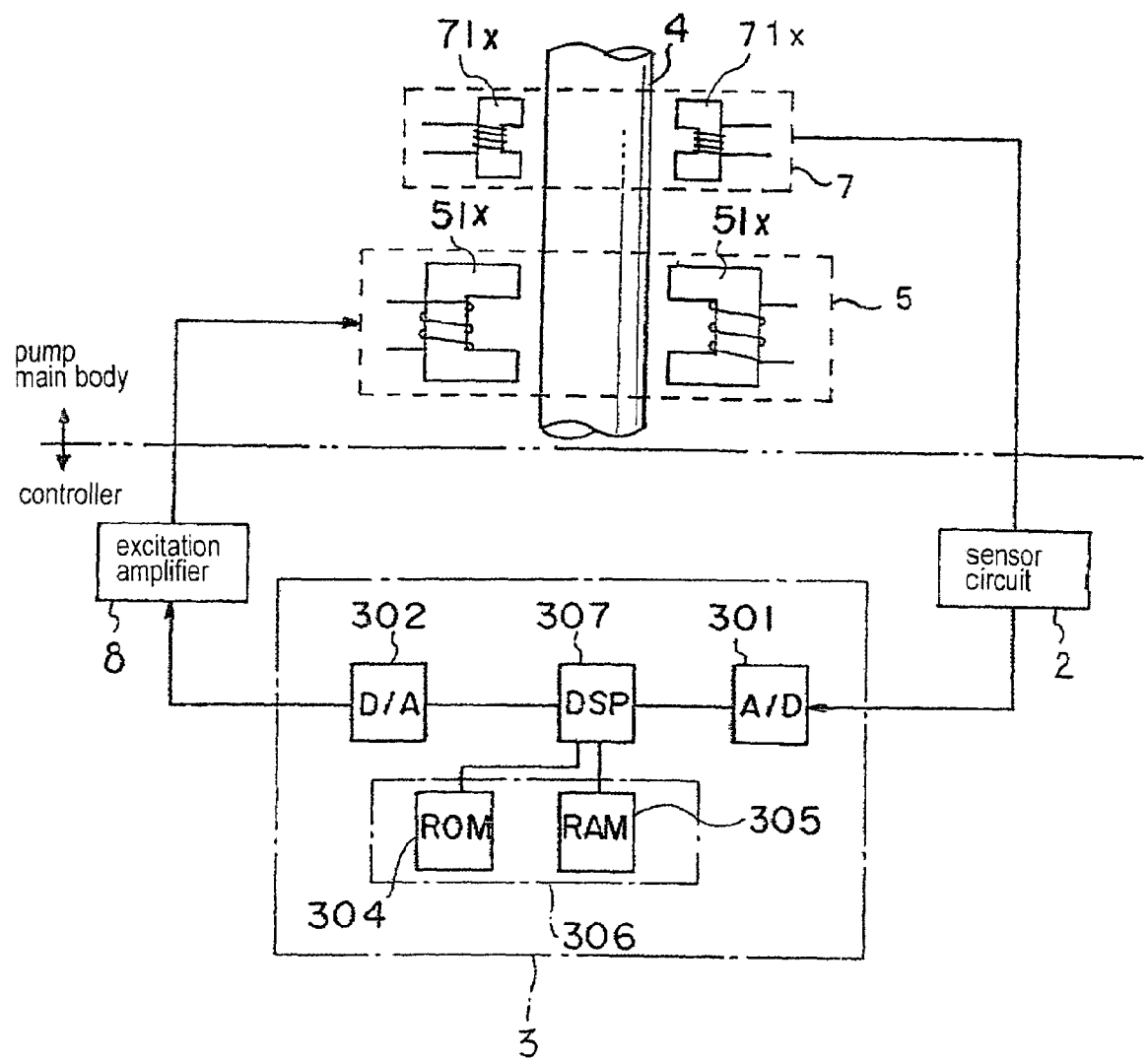
FIG. 3 is a block diagram showing the basic configuration of a magnetic levitation control system.

FIG. 3 is a block drawing showing the basic configuration of a magnetic levitation control system of the magnetic bearing device, and it shows only one axis in the radial direction relating to part of the magnetic bearing. A pair of radial electromagnets 51x is shown as the electromagnet 5, and radial displacement sensors 71x corresponding to the electromagnets 51x are shown as the displacement sensor 7. The displacement sensor 7 is an inductance type sensor, and it converts a gap displacement to an electrical signal using the change of impedance of the sensor part due to change of the gap displacement. The face of the rotor 4 opposite the sensor comprises a ferromagnetic body or a conductive body.

The controller for driving the pump main body 1 includes a sensor circuit 2, a control circuit 3, and an excitation amplifier 8. The control circuit 3 has an A/D converter 301, a D/A converter 302, a DSP (digital signal processor) 307 being a calculation part, and a storage part 306 having ROM 304 and RAM 305, and may include other types of memory devices commonly used for storage.

A carrier wave of several tens of kHz is applied to the displacement sensor 7 by the sensor circuit 2, and the carrier wave is amplitude modulated according to the change of impedance of the sensor part caused by the gap displacement. This amplitude modulated wave (AM wave) is input to the control circuit 3 via the sensor circuit 2 as a sensor signal. In the case of the radial displacement sensors 71x, the difference of the sensor signals from each displacement sensor 71x is calculated in the sensor circuit 2, and that difference component is input to the control circuit 3 as the sensor signal.

Still referring to FIG. 3, the analog sensor signal input to the control circuit 3 is converted to a digital value by the A/D converter 301, and it is input to the DSP 307. A magnetic levitation control constant has been input in advance in the storage part 306, and the DSP 307 calculates the excitation current to be sent to the electromagnet 5 based on the output of the displacement sensor 7 and the control constant. For example, in the case when the floating position of the rotor 4 is shifted to the left of the proper position, it is controlled to become in the proper position by increasing the excitation current of the electromagnet 51x on the right side. The amount of current control at this time is calculated by PID calculation. A control signal corresponding to the excitation current to be supplied is output from the DSP 307, and that control signal is input to the excitation amplifier 8 after being converted to an analog value by the D/A converter 302.

Generally, in the case when performing calculation processing by converting analog signals to digital signals by A/D converter, in order to prevent the generation of aliasing, the sampling frequency is set to at least 2 times the maximum frequency of the signal input to the A/D converter according to the sampling theorem. This way of thinking is applicable also in the case of prior magnetic bearing devices, and the sampling frequency $f_s$ is set such that $f_s > 2(f_c + f_r)$. Here, $f_c + f_r$ is the maximum frequency of the sensor signal input to the A/D converter, $f_c$ is the carrier wave frequency, and $f_r$ is the modulated frequency according to the rotor displacement.

However, in the present invention, the sampling frequency $f_s$ is set according to the following equations (1) and (2). The sampling frequency $f_s$ in this case becomes a frequency lower than in the case when set according to the sampling theorem.

In the case of a turbo-molecular pump, the frequency $f_r$ of the rotor displacement signal is limited to a range of comparatively narrow band, and if the sampling frequency $f_s$ is set so as to satisfy the conditions of the following equations (1) and (2), alleviation of the calculation processing can be devised without generating aliasing.

(Case 1): $(1/2)f_s \leq f_c - f_r, \leq f_c + f_r, \leq f_s$     (1)

(Case 2): $f_s \leq f_c - f_r, \leq f_c + f_r, < (3/2)f_s$     (2)

In the control circuit 3, discretization of the input sensor signal is performed at the above sampling frequency $f_s$, and after that, each processing of demodulation and smoothing is performed, and various kinds of calculation processing is performed based on the digitized signal. The range of the above case 2 is relative to frequency 0 and is symmetric to the range of case 1, for example, an outline of this processing is explained as follows taking the example of case 1.

A signal comprising a carrier wave of frequency $f_c$, amplitude modulated at frequency $f_r$, having a band a signal, accordingly has a band $(f_c - f_r) \sim (f_c + f_r)$. The signal is then input into the A/D converter 301. If this signal is discretized at sampling frequency $f_s$, the frequency band of the discretized signal becomes $f_s - (f_c - f_r) \sim f_s - (f_c + f_r)$. Rewriting this, it becomes $(f_s - f_c) - f_r \sim (f_s - f_c) + f_r$. Also, in the case when it was set as in case 1, the upper end of the band becomes $(f_s - f_c) + f_r < (1/2)f_s$, and the lower end of the band becomes $0 < (f_s - f_c) - f_r$. Therefore, the calculation processing can be performed without being subject to the influence of folding back.

Demodulation is performed by multiplying a sine wave of frequency $(f_s - f_c)$ by the above discretized signal having frequency band $(f_s - f_c) - fr \sim (f_s - f_c) + f_r$. Here, by a trigonometric formula, the multiplication of the two frequency components (f1, f2) can be decomposed into the sum of a frequency component of f1+f2 and a frequency component of f1−f2. Therefore, by demodulation processing, the frequency band $(f_s - f_c) - f_r \sim (f_s - f_c) + f_r$ is decomposed into a frequency band $-f_r \sim f_r$, and a frequency band $2(f_s - f_c) - f_r \sim 2(f_s - f_c) + f_r$.

That which is finally used among the above two frequency bands is a signal of frequency band $-f_r \sim f_r$. The frequency band $2(f_s - f_c) - f_r \sim 2(f_s - f_c) + f_r$ is an unwanted band. This unwanted frequency band is removed by filtering such as by a low-pass filter or a band-pass filter. The central frequency to eliminate is $2(f_s - f_c)$, and it is necessary to configure a steep filter to eliminate only the vicinity of $2(f_s - f_c)$ without attenuating the vicinity of direct current (vicinity of frequency 0).

In the demodulation processing described above, the sine wave value of frequency $(f_s - f_c)$ is multiplied by the discretized signal at each sampling period $T_s$. Therefore, if the sampling frequency $f_s$ is set according to the following equation (3), the sine wave discrete value signal should be set such that it becomes the same value precisely at each time $nT_s$, and the calculation processing can be performed more easily as follows:

$|f_s - f_c| = f_s/n$     (3)

where, n is an integer.

Solutions to equation (3) includes, in the case of case 1, wherein $f_c = (2/3)f_s$, $f_c = (3/4)f_s$, $f_c = (4/5)f_s$, $f_c = (5/6)f_s$, ..., and the like. But when $f_c = (3/4)f_s$, $f_s/n$ becomes $(1/4)f_s$. Since $(1/4)f_s$ is the middle of the frequency range $0 \sim (1/2)f_s$, the frequency $f_r$ can be obtained at the largest value. Also, regarding case 2, values of $f_c$ that satisfy equation (3) include: $f_c = (4/3)f_s$; $f_c = (5/4)f_s$; $f_c = (6/5)f_s$; $f_c = (7/6)f_s$ ... ; and the like. However, when $f_c = (5/4)f_s$, $f_s/n$ becomes $(1/4)f_s$, and being the middle of the frequency range $0 \sim (1/2)f_s$, the frequency $f_r$ can be obtained at the largest value. Accordingly, it is preferable that the sampling frequency $f_s$ be set such that $f_c = (3/4)f_s$ or $f_c = (5/4)f_s$.

Figure 4:
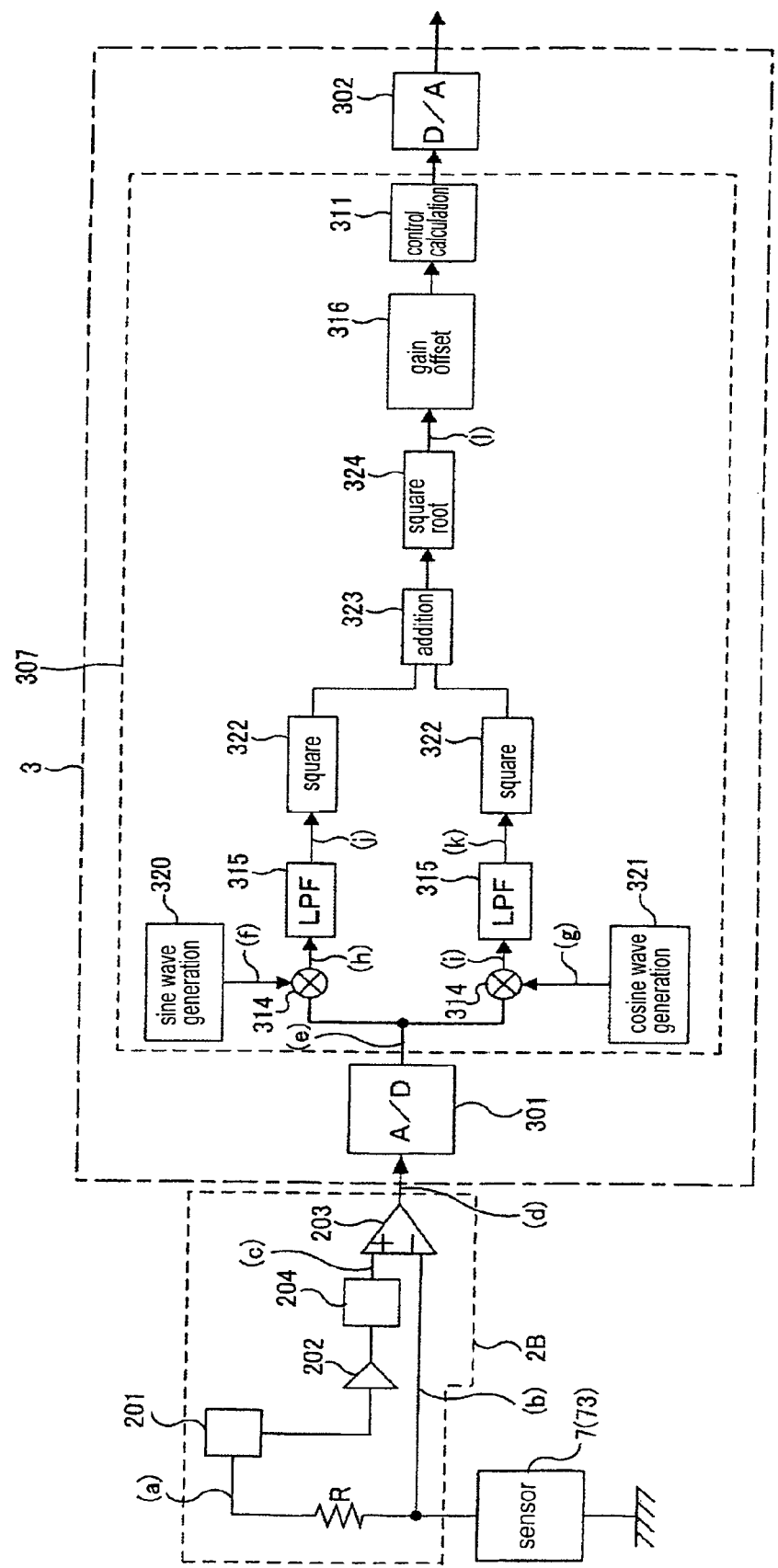
FIG. 4 is a block diagram showing the configuration of a digital signal processor (DSP) according to the device of FIG. 1.
Figure 5:
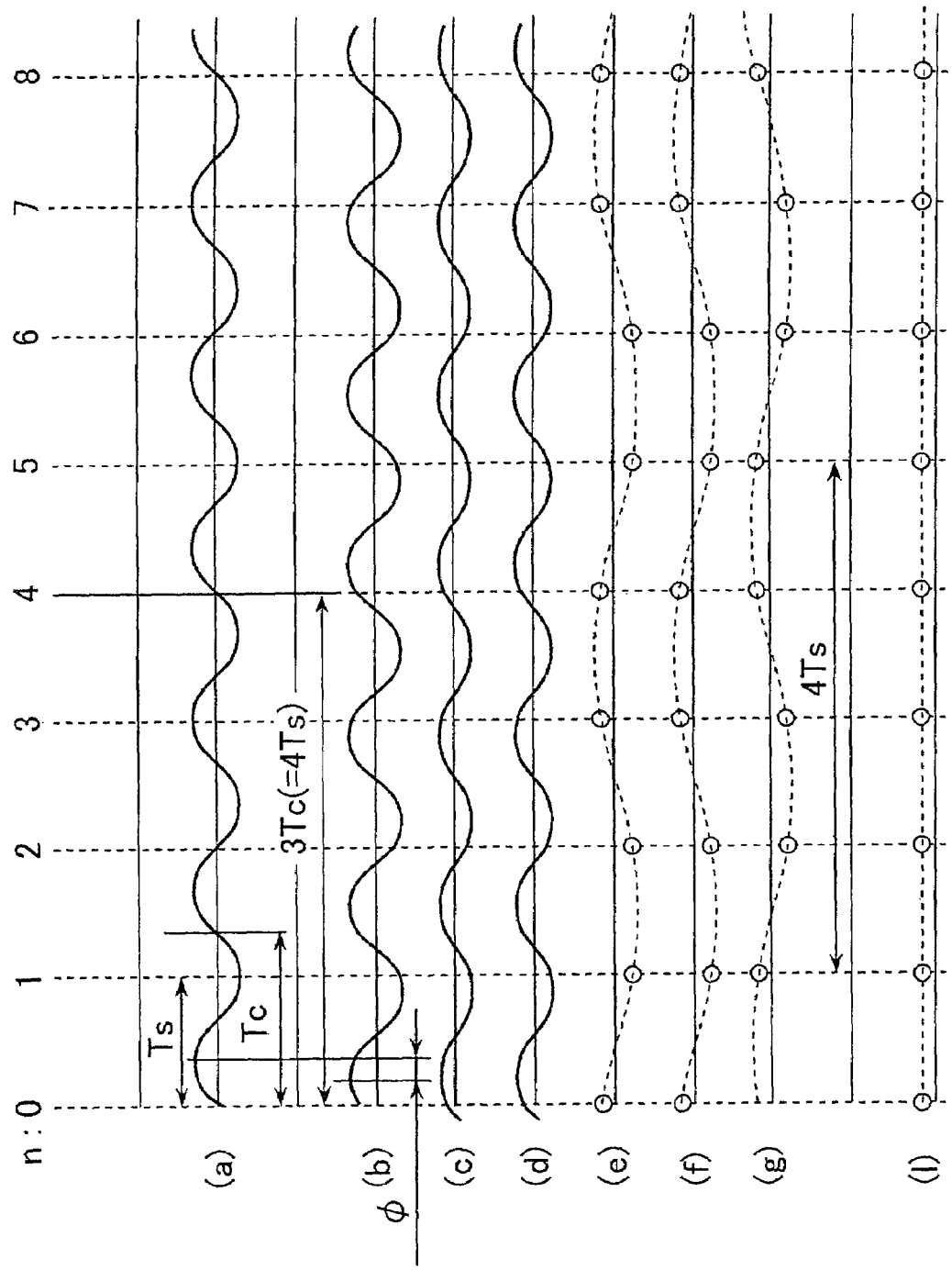
FIG. 5 is a diagram showing one example of the signals (a)-(g) and (l) according to FIG. 4.

FIG. 4 is a block drawing showing the configuration of the sensor circuit 2 and the DSP 307 provided in the control circuit 3 shown in FIG. 3, and relates to an axial axis control system. Also, FIG. 5 shows one exemplary set of the signals (a)~(g) and (l) in FIG. 4. In FIG. 4, the sensor circuit 2 is provided with a carrier wave generation part 201, and the generated carrier wave is applied to a displacement sensor 7 (73) directly connected via a resistor R.

The carrier wave signal (a) output from the carrier wave generation part 201 is represented by $a_1 \sin(2\pi f_c t)$, as shown in FIG. 5. The horizontal axis in FIG. 5 represents time and the timing $nT_s$ of sampling. $T_s$ is the sampling period, and when $f_s$ is the sampling frequency, $T_s = 1/f_s$. Also, $f_c$ and $T_c$ are the frequency and the period, respectively, of the carrier wave. In the present embodiment, although the sampling frequency $f_s$ is explained with respect to the case of the preferable condition $f_c = 3/4 f_s$ described above, the same kind of argument is established for all sampling frequencies $f_s$ satisfying the conditions (1) and (2) described above.

Still referring to FIG. 4, when the carrier wave signal (a) is applied to the displacement sensor 7, it is amplitude modulated by the change of impedance, and an AM wave $a_2 \sin(2\pi f_c t + \phi)$, having a phase shift $\phi$ as signal (b), is output from the displacement sensor 7 to the operational amplifier 203. In addition, the carrier wave signal $a_1 \sin(2\pi f_c t)$ generated by the carrier wave generation part 201 is input to a gain correction part 202 to become $a_3 \sin(2\pi f_c t)$. The signal (c) is then phase shifted by an amount the same as the above phase shift $\phi$ by a phase shifting part 204 and is output to the operating amplifier 203 as the carrier wave base signal. At this time, the carrier wave base signal is represented as $a_3 \sin(2\pi f_c t + \phi)$. Here, it is set such that $a_3 < a_2$ or $a_3 > a_2$.

In the case when the impedance of the displacement sensor 7 is large, the phase shift of the sensor output signal (AM wave) against the carrier wave base signal output from the gain correction part 202 becomes large, and the influence of the phase shift is greatly received if the difference is calculated as such. Therefore, the carrier wave base signal is phase shifted by the phase shifting part 204 such that the phase shift with the sensor signal becomes substantially zero.

A difference signal between the signal (b) $a_2 \sin(2\pi f_c t + \phi)$ amplitude modulated by the displacement sensor 7 and the carrier wave base signal (c) $a_3 \sin(2\pi f_c t + \phi)$ input from the phase shifting part 204 is acquired by the operating amplifier 203. The difference signal (d) is represented as $a_4 \sin(2\pi f_c t + \phi)$. Here, $a_4 = a_2 - a_3$.

Next, the details of the demodulation processing in the DSP 307 are explained. The difference signal (d) output from the sensor circuit 2B is converted into a digital value by the A/D converter 301. The sampling frequency $f_s$ at this time is set such that $f_c = (3/4)f_s$ as described above. The frequency of the signal discretized by the A/D converter 301 becomes $(f_s - f_c)$, and the discretized signal is lowered in frequency to $f_s/4$.

The signal (e) in FIG. 5 is the discrete value signal obtained by sampling the value of the signal (d) at each time $nT_s$ (where, n=0, 1, 2, ... ), and it is represented by the following equation (4).

$a_4 \sin(2\pi f_c \cdot nT_s + \phi)$     (4)

Here, because there is the relationship $f_c = (3/4)f_s$, if $T_s = 3/(4f_c)$ is substituted into equation (4), it can be transformed as equation (5).

$$a_4 \sin(2\pi f_c \cdot nT_s + \varphi) = a_4 \sin(2\pi f_c \cdot 3n/(4f_c) + \varphi) \quad (5)$$
$$= a_4 \sin(3\pi n/2 + \varphi)$$
$$= a_4 \sin(3\pi n/2 + \varphi + 6\pi)$$
$$= a_4 \sin\{(3\pi/2)\cdot(n+4) + \varphi)\}$$

That is, it is clear that the discrete value signal has the period $4T_s$, and it is represented as $a_5 \sin\{2\pi(f_s/4)\cdot nT_s + \phi'\}$. Thus, by setting the sampling frequency $f_s$ such that $f_c=(3/4)f_s$ is satisfied, the discrete value signal after sampling can be made low frequency to $f_s/4$. Therefore, the modulated signal made lower in frequency should be demodulated by the DSP 307.

After that, the difference signal output from the A/D converter 301 is divided into two, and a sine wave discrete value signal "(f)=sin $\{2\pi(f_s/4)\cdot nT_s\}$" from a sine wave discrete value calculation part 320 is multiplied by one of the branched difference signals. A cosine wave discrete value signal "(g)=sin $\{2\pi(f_s/4)\cdot nT_s - \pi/2\} = -\cos\{2\pi(f_s/4)\cdot nT_s\}$" from a cosine wave discrete value calculation part 321 is multiplied by the other difference signal. At this time, it may be that the sine wave discrete value signal (f) and the cosine wave discrete value signal (g) are not synchronized with the signal (e).

The multiplication results (h) and (i) calculated by a multiplication part 314 on each branched signal (e) are represented by the following equations.

(h) $a_5 \sin\{(\pi f_s/2)\cdot nT_s + \phi'\}\cdot\sin\{(\pi f_s/2)\cdot nT_s\} = \{a_5 \cos\phi' - a_5 \cos(2\pi(f_s/2)\cdot nT_s + \phi')\}/2$ (i) $a_5 \sin\{(\pi f_s/2)\cdot nT_s + \phi'\}\cdot\cos\{(\pi f_s/2)\cdot nT_s\} = -\{a_5 \sin\phi' + a_5 \sin(2\pi(f_s/2)\cdot nT_s + \phi')\}/2$ A low-pass filter calculation part 315 removes the high-frequency component, that is, a signal of 1/2 frequency of the carrier wave frequency, included in each signal (h) and (i), and the low-frequency component of each signal (h) and (i) is extracted as signal (j) and signal (k). Because the direct current component is considered as the low-frequency component, signal (j) is the direct current component ($a_5 \cos\phi'$)/2 of signal (h), and signal (k) is the direct current component ($-a_5 \sin\phi'$)/2 of signal (i).

The signals (j) and (k) are then squared by a square calculation part 322, and each calculation result is added together by an addition part 323. Furthermore, when that calculation result is processed by a square root calculation part 324, the signal $a_5/2$, as shown by signal (l) in FIG. 5, is obtained. After that, gain correction and offset correction are performed by a gain and offset calculation part 316. In addition, calculation of the amount of electromagnet current control is performed by a control calculation part 311 based on the signal after correction.

Second Embodiment

Figure 6:
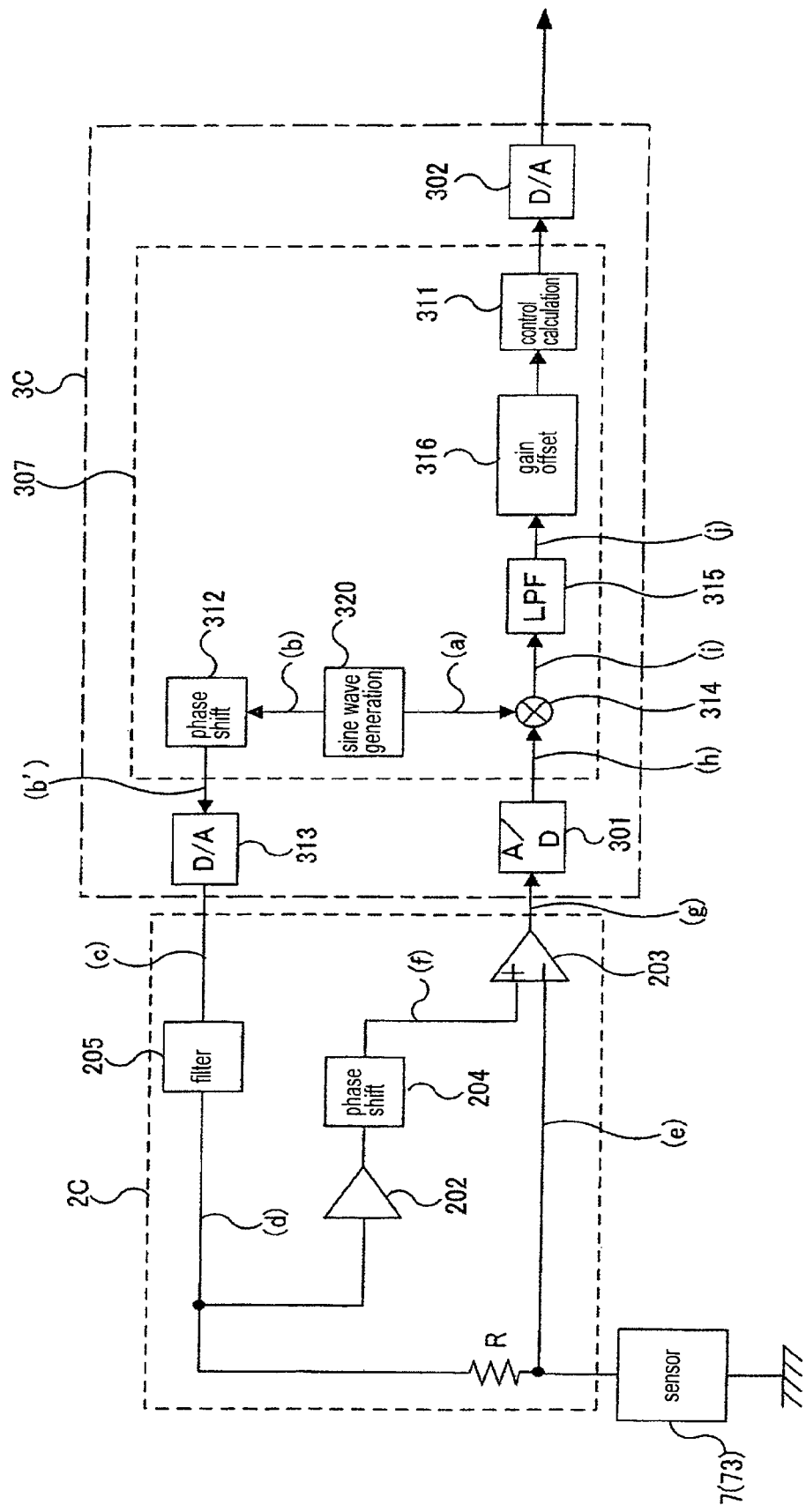
FIG. 6 is a block diagram showing a second embodiment of a magnetic bearing device.

In the first embodiment described above, rectification processing is performed in an asynchronous state between the difference signal and the sine wave discrete value signal and cosine wave discrete value signal. However, in a second embodiment, the rectification processing is performed in a synchronous state. FIG. 6 is a block drawing related to another embodiment of an axial axis control system. In the second embodiment, the sampling frequency $f_s$ is set in the same manner as in the first embodiment.

In the control system of FIG. 4, the carrier wave generated by the carrier wave generation part 201 of the sensor circuit 2B is applied to the displacement sensor 7. In the second embodiment, however, the sine wave discrete value generated by the sine wave discrete value generation part 320 of the DSP 307 is converted into an analog signal by a D/A converter 313 and is applied to the displacement sensor 7 as the carrier wave.

In the multiplication part 314 of the DSP 307, synchronized wave detection (rectification) is performed by multiplying the sine wave discrete value generated by the sine wave discrete value generation part 320 by the difference signal from the A/D converter 301. Because there is a phase shift between the sensor output signal and the sine wave generated by the sine wave discrete value generation part 320, the difference signal is separated into two components; one being a component in the same phase as the sine wave and one delayed 90 degrees.

Therefore, in order to remove the signal component having the sign information, the phase of the difference signal during multiplication should become substantially the same phase as the phase of the sine wave. Here, the phase of the carrier wave output to the sensor circuit 2C is shifted by the phase shifting calculation part 312 of the DSP 307 such that the difference signal during multiplication and the sine wave discrete value have the same phase.

Figure 7:
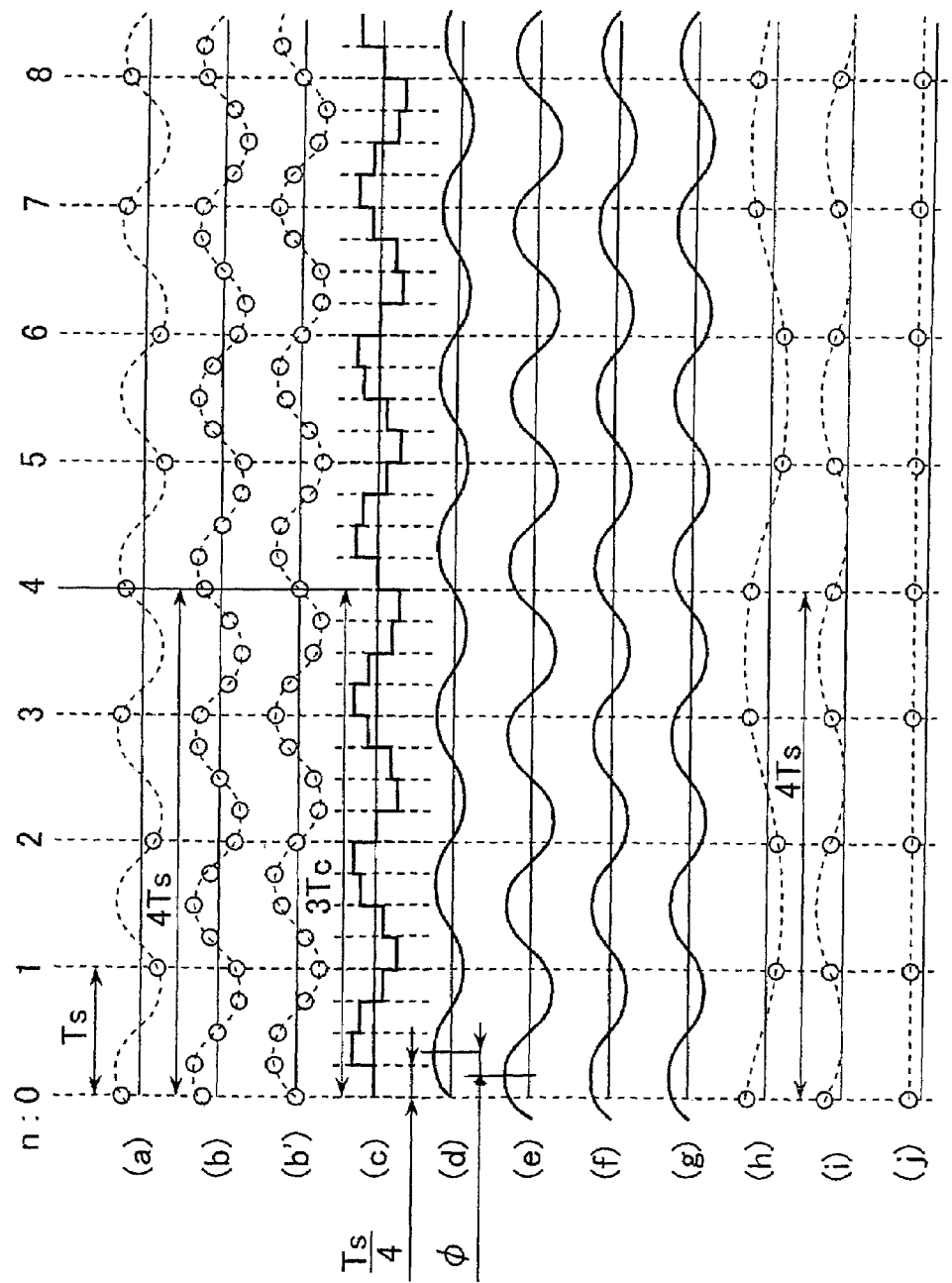
FIG. 7 shows one example of each signal (a)-(j) in FIG. 6.

FIG. 7 shows one example of each signal (a)~(j) in FIG. 6 and is described below in respect to the case where the sampling frequency $f_s$ is set such that $f_c=(3/4)f_s$. From the sine wave discrete value generation part 320 in FIG. 6, the signal (a) is output to the multiplication part 314, and the signal (b) is output to the phase shift calculation part 312.

The signal (a) is the result of having sampled the sine wave signal $a_1 \sin(2\pi f_c \cdot t + \phi)$ at the time interval $T_s$, and it is represented as $a_1 \sin(2\pi f_c \cdot nT_s + \phi)$. The sampling frequency $f_s$ corresponding to the period $T_s$ is set such that $f_c=(3/4)\cdot f_s$ is satisfied. On the other hand, the signal (b), having sampled the sine wave signal $a_1 \sin(2\pi f_c \cdot t + \phi)$ at the time interval $T_s/4$, is represented as $a_1 \sin(2\pi f_c \cdot mT_s/4 + \phi)$. Both signals (a) and (b) are discrete value signals having a period $4T_s$ over the sampling period $T_s$ of the A/D converter 301. Signals (a) and (b) that have sampled the sine wave signal $a_1 \sin(2\pi f_c \cdot t + \phi)$ at a time interval $T_s/8$, or the like, may also be used.

When the signal (b) is phase shifted $-\phi$ by the phase shift calculation part 312, the discrete value signal (b') after phase shifting becomes $a_1 \sin(2\pi f_c \cdot mT_s/4)$. When this discrete value signal (b') is input to the D/A converter 313, the analog signal (c) is output. High frequency is included in the waveform of the signal (c) and it is step-shaped. Therefore, by filtering this signal (c) by a filter circuit 205 such as a low-pass filter or band-pass filter, a smooth carrier wave signal $a_2 \sin(2\pi f_c t)$ as shown by signal (d) is obtained. Here, the phase shifting by the filtering is ignored for the sake of convenience.

When the carrier wave signal "(d)=$a_2 \sin(2\pi f_c t)$" is applied to the displacement sensor 7, the AM wave signal "(e)=$a_3 \sin(2\pi f_c t + \phi)$" is obtained. In this example, the phase shift of the AM wave signal against the carrier wave signal is $+\phi$, and in the phase shift calculation part 312, it is phase shifted by $-\phi$ so as to correspond to $+\phi$. Therefore, the AM wave signal (e) and the sine wave discrete value signal (a) described above have become in the same phase.

The carrier wave base signal "(f)=$a_4 \sin(2\pi f_c t + \phi)$" obtained by processing the carrier wave signal (d) by the gain correction part 202 and phase shift part 204, and the AM wave signal (e) from the displacement sensor 7, are input to the operational amplifier 203. The operational amplifier 203 outputs the difference signal "(g)=$a_5 \sin(2\pi f_c t + \phi)$" to the A/D converter 301. In the A/D converter 301, this difference signal (g) is sampled at the sampling frequency $f_s(=(4/3)f_c)$. As a result, the discrete value signal "(h)=$a_6 \sin \{2\pi(f_s/4) \cdot nT_s + \phi'\}$" of period $4T_s$ (frequency $f_s/4$) is obtained just as in the first embodiment described above.

The difference signal discrete value (h) output from the A/D converter 301 and the sine wave discrete value signal (a) from the sine wave discrete value generation part 320 are multiplied by the multiplication part 314. The sine wave discrete value signal (a), having sampled the sine wave signal $a_1 \sin(2\pi f_c \cdot t + \phi)$ at a timing of $nT_s$, that is, at the sampling frequency $f_s(=(4/3)f_c)$, is represented by $a_7 \sin \{2\pi(f_s/4) \cdot nT_s + \phi'\}$, having been reduced in frequency to $f_s/4$. Therefore, the multiplication result (i) is represented by the following equation.

(i) $a_6 a_7 \sin^2 \{2\pi(f_s/4) \cdot nT_s + \phi')\} = a_6 a_7 \{1 - \cos(2\pi(f_s/2) \cdot nT_s + \phi'))\}/2$ When the signal (i) is input to the low-pass filter 315, the direct current component signal (j)=$a_6 a_7/2$ representing the rotor displacement signal is output from the low-pass filter 315. After that, gain correction and offset correction are performed in the gain and offset calculation part 316, and control calculation is performed based on the signal after that correction.

In the block drawing of FIG. 6, the phase shift calculation part 312 is provided between the sine wave discrete value generation part 320 and the D/A converter 313. It may however, be placed between the sine wave discrete value generation part 320 and the multiplication part 314. That is, it may be made such that the phases of the difference signal (h) and the sine wave discrete value signal (a) during multiplication are matched by phase shifting the sine wave discrete value signal (a).

Third Embodiment

Figure 8:
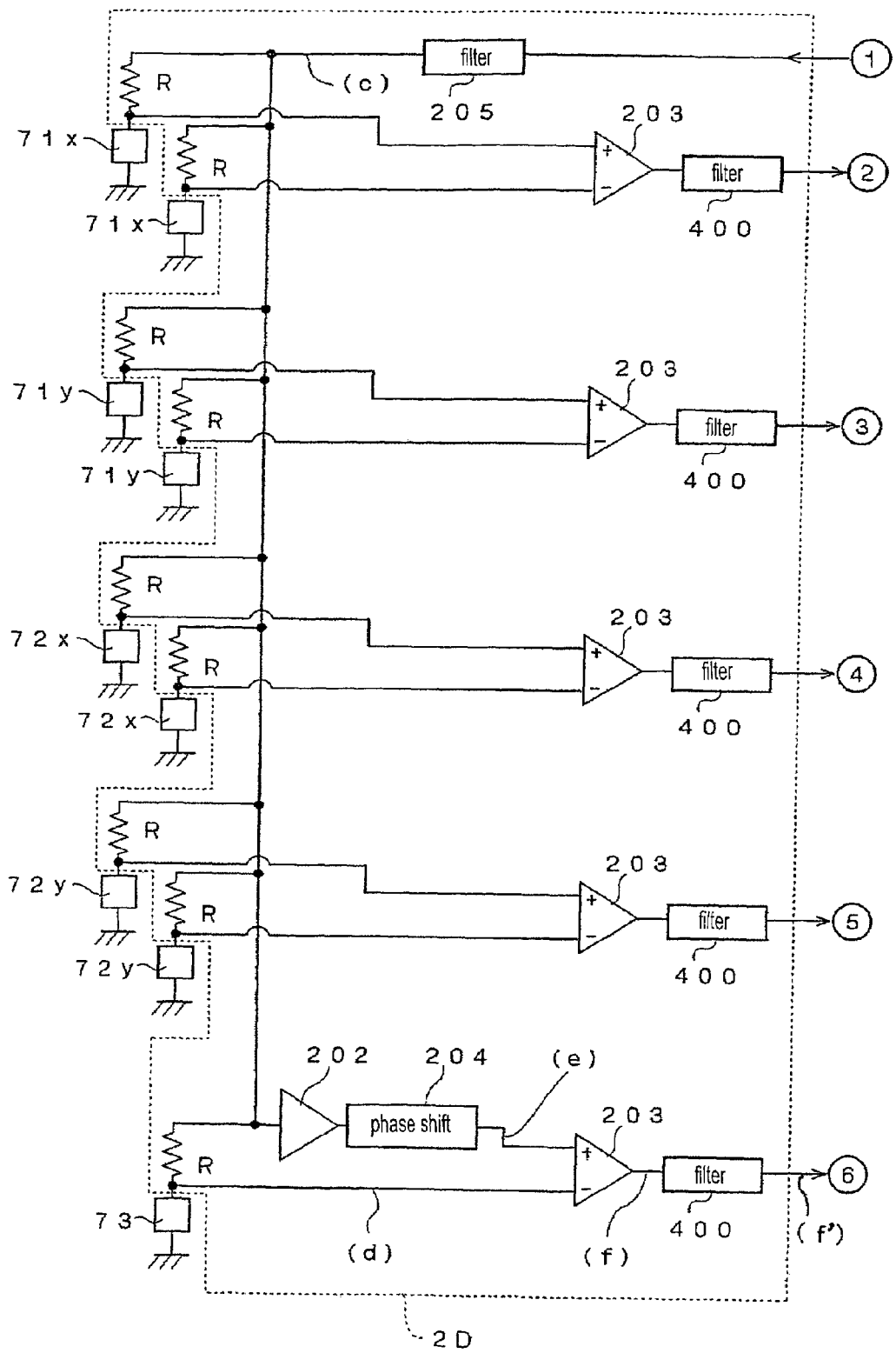
FIG. 8 is a block diagram, showing the control system according to a third embodiment, including displacement sensors 71x, 71y, 72x, 72y, 73, and sensor circuit 2D.
Figure 9:
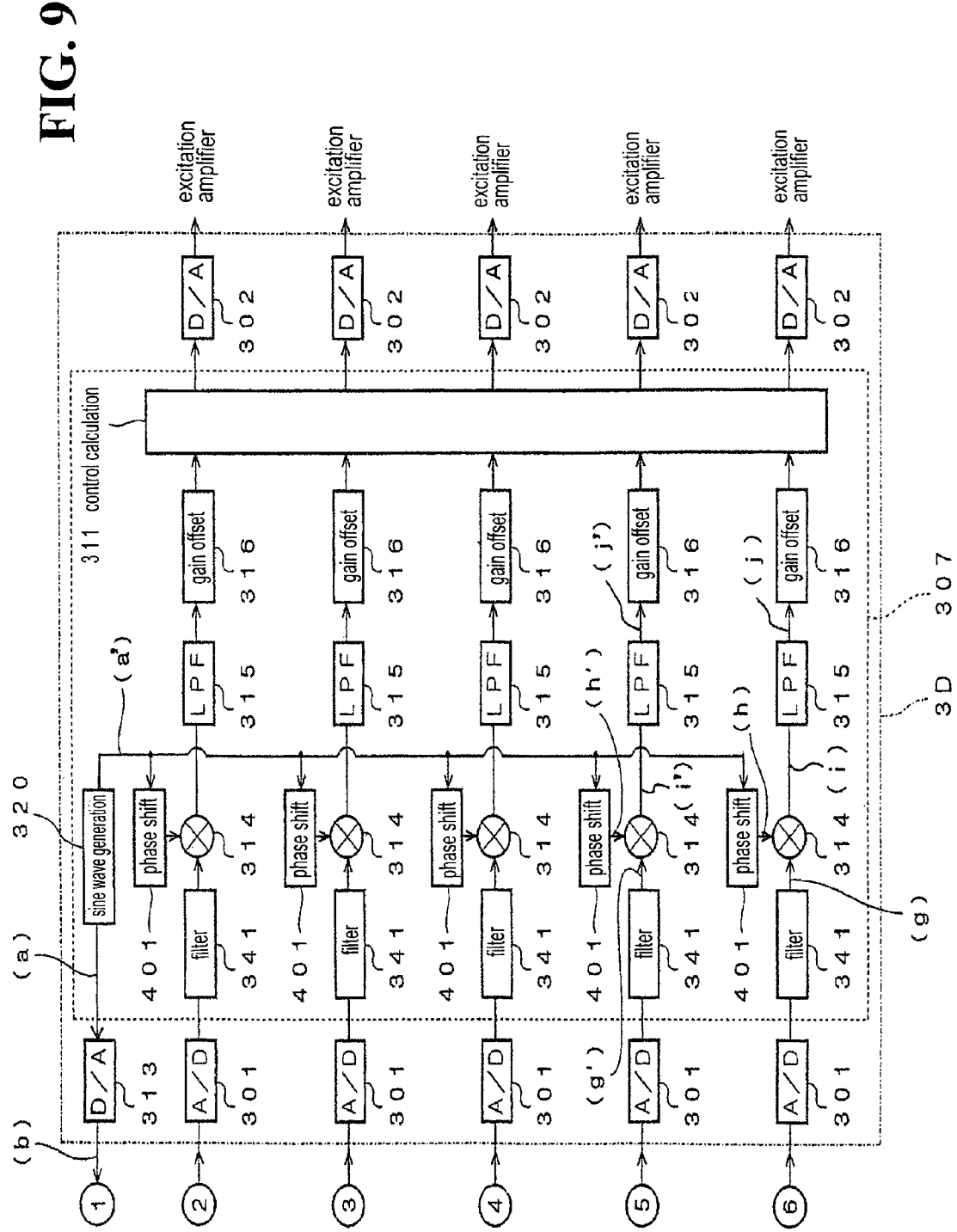
FIG. 9 is a block diagram showing the control system according to a third embodiment, including control circuit 3D.

FIG. 8 and FIG. 9 are block drawings of the control system in a third embodiment, and illustrate the entirety of five-axis control. FIG. 8 is a drawing showing each displacement sensor 71x, 71y, 72x, 72y, 73, and the sensor circuit 2D, whereas FIG. 9 shows the control circuit 3D. The radial displacement sensors 71x, 71y, 72x and 72y are displacement sensors corresponding to each radial electromagnet 51x, 51y, 52x and 52y shown in FIG. 2.

Parts similar to those shown in FIG. 6 are assigned same symbols. The explanation below centers on different parts. Also, the sampling frequency $f_s$ in the A/D converter 301 is set in the same manner as in the first and second embodiments. Below, it is explained with respect to the case when set to $f_c=(3/4)f_s$.

Figure 10:
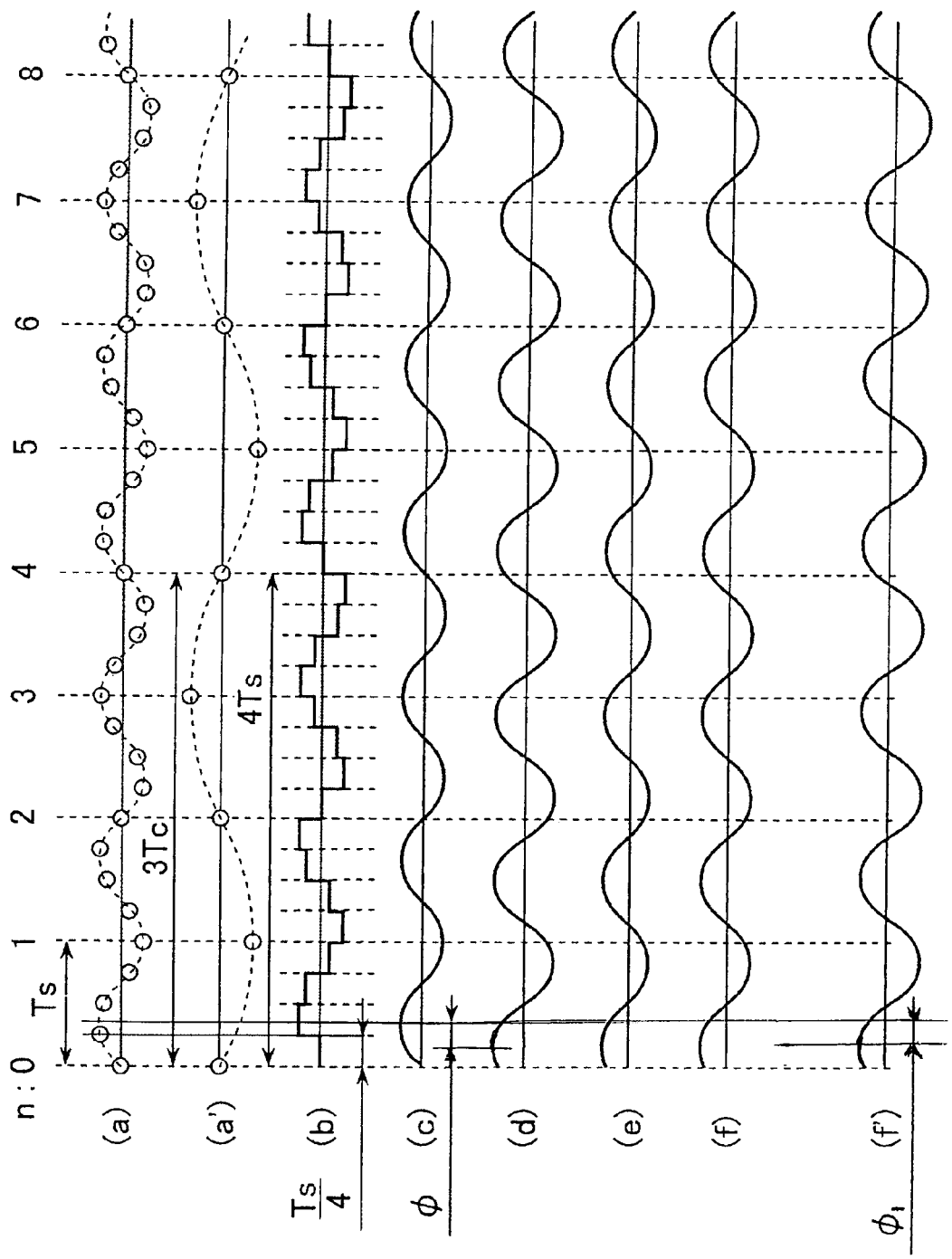
FIG. 10 shows one example of each signal (a)-(f') in FIGS. 8 and 9.
Figure 11:
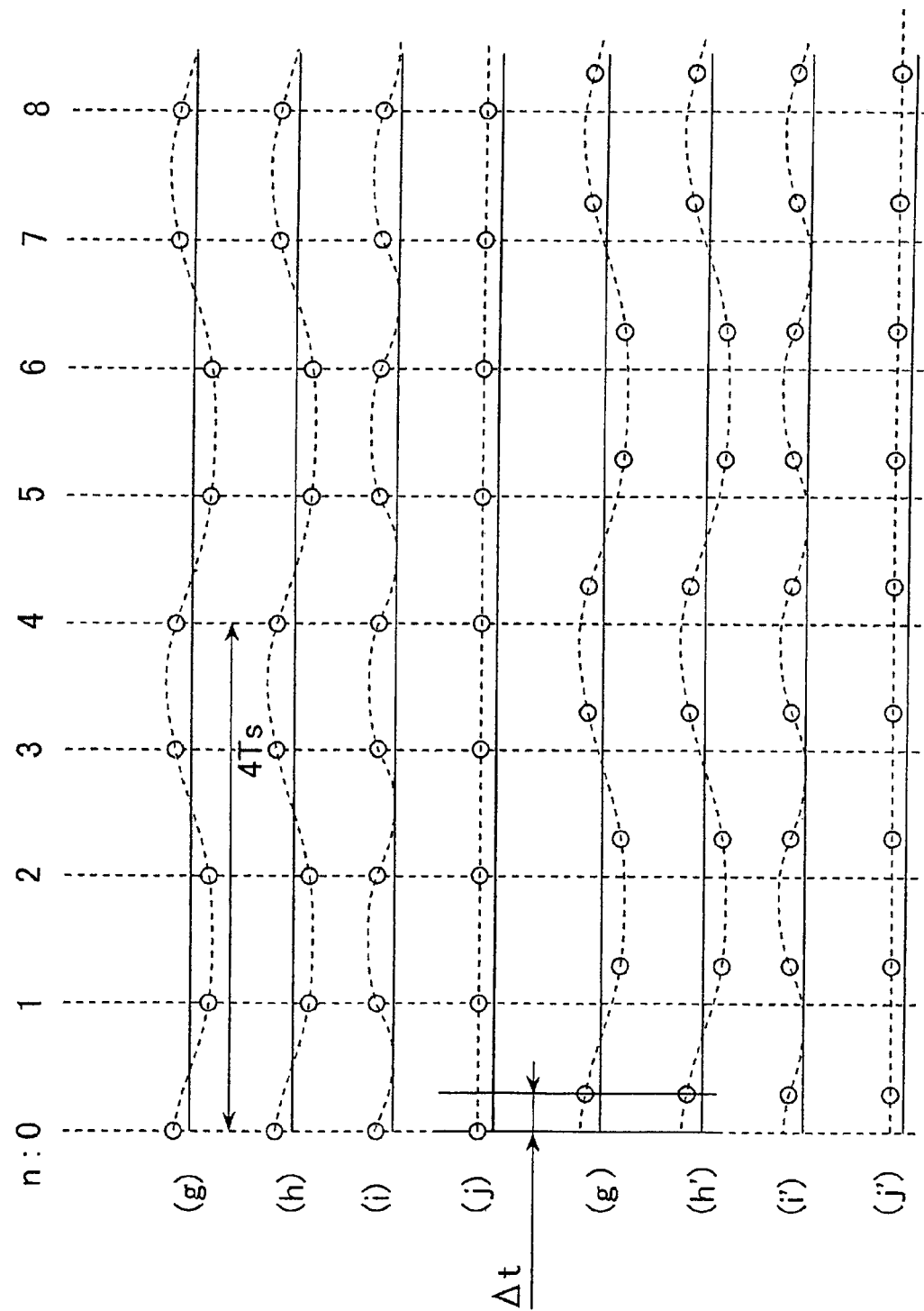
FIG. 11 shows one example of each signal (g)-(j) in FIG. 9.

FIGS. 10 and 11 show one example of each signal (a)~(j') in FIG. 8 and FIG. 9. Just as in the second embodiment described above, the sine wave discrete value signal (a) used for carrier wave generation and the sine wave discrete value signal (a') used for demodulation are output from the sine wave discrete value generation part 320. The signal (a) is that having sampled the sine wave signal $a_1 \sin(2\pi f_c \cdot t)$ at the time interval $T_s/4$, and it is represented as $a_1 \sin(2\pi f_c \cdot mT_s/4 + \phi)$.

On the other hand, the signal (a') is that having sampled the sine wave signal $a_1 \sin(2\pi f_c \cdot t)$ at the time interval $T_s$, and it is represented by $a_1 \sin(2\pi f_c \cdot nT_s)$. Here, because it has been set to $f_c=(3/4) \cdot f_s$, it has become $3T_c=4T_s$, and the signal (a') can be transformed as shown in the following equation.

(a') $a_1 \sin(2\pi f_c \cdot mT_s) = a_1 \sin(2\pi nT_s/T_c) = a_1 \sin(3\pi/2 \cdot n)$ That is, the signal (a') has become a signal having the period $4T_s$, and it is represented as "-$a_1 \sin(2\pi(f_s/4) \cdot nT_s)$," as shown by signal (a') in FIG. 10. Both signals (a) and (a') have become discrete value signals having the period $4T_s$ over the sampling period $T_s$ of the A/D converter 301.

The sine wave discrete value signal (a), output as the carrier wave signal from the sine wave discrete value generation part 320, is converted into the analog signal (b) by the D/A converter 313. The analog signal (b) is filtered by filter circuit 205, and as a result, the carrier wave signal (c)=$a_2 \sin(2\pi f_c \cdot t)$ is generated, having the high frequency removed. The carrier wave signal (c) is input to the radial displacement sensors 71x, 71y, 72x, 72y and 73, respectively.

Each radial displacement sensor 71x, 71y, 72x and 72y is provided as a pair sandwiching the rotor 4, and the carrier wave signal (c) is input to each. Also, in order to improve linearity of the sensor signal, the difference of the signals output from each of the pair of displacement sensors, for example the pair of displacement sensors 71x, is used as the sensor signal.

The AM wave signals output from each of the pair of displacement sensors 71x are input to the operational amplifier 203, which generates a difference signal. Also, as for the AM wave signal (d)=$a_3 \sin(2\pi f_c \cdot t + \phi)$ output from the axial displacement sensor 73, it is processed in the same manner as the case explained with FIG. 6. Difference processing between the carrier wave base signal (e)=$a_4 \sin(2\pi f_c \cdot t + \phi)$ and the AM wave signal (d) is performed by the operating amplifier 203.

Each difference signal output from the operational amplifier 203 undergoes band-pass processing to make the carrier wave frequency the central frequency in a filter circuit 400. By this, improvement of the S/N ratio in the subsequent wave detection processing may be achieved. The signal output from each filter circuit 400 is converted to a digital value by the A/D converter 301 (see FIG. 9).

As shown in FIG. 8, the difference signal, (f)=$a_5 \sin(2\pi f_c \cdot t + \phi)$, between the signal (e) and the signal (d) is output from the operational amplifier 203. The signal (f) undergoes filter processing by the filter circuit 400, and it becomes the signal (f')=$a_6 \sin(2\pi f_c \cdot t + \phi_1)$. The signal (f') is sampled at the sampling frequency $f_s$ by the A/D converter 301. Filter processing is likewise performed for each difference signal pertaining to the radial displacement sensors 71x, 71y, 72x and 72y, and they are sampled at the sampling frequency $f_s(=(4/3)f_c)$ by the A/D converter 301.

For each signal digitally converted, the offset amount included in the difference signal is removed by a filter calculation part 341 that performs band-pass processing or high-pass processing. The signals (g) and (g') output from the filter calculation part 341 and the signals (h) and (h') from the phase shift calculation part 401 are input to the multiplication part 314, and they are multiplied.

Each difference signal input to the multiplication part 314 is phase shifted based upon the sine wave discrete value signal generated by the sine wave discrete value generation part 320. More specifically, each is subject to (1) a process of being D/A converted and passed through an analog filter, and (2) a process of being applied to the displacement sensor of each axis and passed through an analog filter. Furthermore, because the timing of A/D converting the sensor output difference signal by the A/D converter 301 differs for each control axis, a relative phase shift between each control axis also occurs.

Therefore, the phase shift part calculation 401 corresponding to each axis operates to phase shift the sine wave discrete value from the sine wave discrete value generation part 320 by a respectively different amount according to the phase shift of each difference signal. As a result, concerning each axis, the difference signal and the sine wave discrete value multiplied therewith become substantially the same value.

For example, because sampling at the sampling frequency $f_s(=(4/3)f_c)$ is performed by the A/D converter 301, the sampled discrete value signal has the period $4T_s$. Therefore, the signal (g) output from the filter calculation part 341 also has the same periodicity, and it is represented as $a_7 \sin\{2\pi(f_s/4)\cdot nT_s+\phi'\}$. On the other hand, for the signal (g'), in the case when compared with the signal (g), the timing of A/D converting by the A/D converter 301 differs by $\Delta T$, and it is represented as $a_8 \sin\{2\pi(f_s/4)\cdot(nT_s-\Delta T)+\phi'\}$.

Thus, because the phases differ between the signal (g) and the signal (g'), the sine wave discrete value signal (h) as $a_9 \sin\{2\pi(f_s/4)\cdot nT_s+\phi'\}$ is output from the phase shift calculation part 401 related to the axial displacement sensor 73, and it is multiplied with the signal $(g)=a_7 \sin\{2\pi(f_s/4)\cdot nT_s+\phi'\}$ by the multiplication part 314. On the other hand, the sine wave discrete value signal (h') as $a_{10} \sin\{2\pi(f_s/4)\cdot(nT_s-\Delta T)+\phi'\}$ is output from the phase shift calculation part 401 related to the radial displacement sensor 72y, and it is multiplied with the signal $(g')=a_8 \sin\{2\pi(f_s/4)\cdot(nT_s-\Delta T)+\phi'\}$ by the multiplication part 314.

Although the processing after the multiplication part 314 is the same as the processing means shown in FIG. 6, the signals (i) and (i') and the signals (h) and (h') are shown in FIG. 11 and are obtained by a calculation similar to that performed the second embodiment.

Because the rectification processing, filter processing, and gain and offset correction processing, which in the past had been performed using analog logic is, as described herein, performed in a software manner by digital calculation processing, shrinking of the circuit size may be achieved. Furthermore, making of the carrier wave frequency a lower frequency may be devised without enlarging the circuit size.

Furthermore, in the present invention, by setting the sampling frequency $f_s$ such that the conditions of the equations (1) and (2) described above are satisfied, alleviation of the calculation processing may be achieved without generating aliasing. That is, because the sampling frequency $f_s$ can be made lower than in the past, the calculation processing and size of the DSP 307 may be reduced, thereby permitting an inexpensive DSP with comparatively low processing capability to be used.

Also, in the third embodiment described above, because it is made such that the carrier wave output from one D/A converter 313 is applied to the displacement sensors 71x, 71y, 72x, 72y and 73 of each axis, and the sine wave discrete value is phase shifted and multiplied by the difference signal output from the displacement sensor, the number of D/A converters 313 may be reduced, a reduction in cost of the circuit is possible, and a shrinking of the circuit size may be achieved.

In the embodiments described above, the two signals multiplied by the multiplication part 314 are phase shifted so as to become substantially the same phase, but it may be that they are in reverse phase (180 deg phase shift) rather than the same phase. In the case of reverse phase, by applying sign conversion to the multiplication results, they become values of the same sign as in the case of same phase.

The embodiments described above embody a magnetic bearing device comprising a turbo-molecular pump. Non-limiting, the present invention may be applied to magnetic bearing devices used in machine tools, vacuum conveyer devices, etc. Furthermore, the magnetic bearing device is not limited to a five-axis control magnetic bearing device, and may be applied also in cases when the number of control axes is different, such as in three-axis control. Also, the present invention is not in any way limited to the above embodiments provided the operability of the present invention is not impaired.

Regarding the embodiments herein described, the rotor 4 refers to the supported body, the DSP 307 refers to the demodulation calculation means, and the control calculation part 311 refers to the control means.

The disclosure of Japanese Patent Application No. 2004-167109 filed on Jun. 4, 2004 is expressly incorporated by reference herein.

While the invention has been explained with reference to the specific embodiments of the invention, the explanation is illustrative and the invention is limited only by the appended aspects.

What is claimed is:

1. A magnetic bearing device, comprising:
    an electromagnet configured to contactlessly support a body;
    an excitation amplifier configured to supply excitation current to said electromagnet;
    carrier wave generation means for generating a carrier wave;
    a sensor configured to modulate said carrier wave according to a floating position of the supported body and to output a sensor signal;
    A/D conversion means for converting said sensor signal to a digital value at a sampling frequency such that a frequency band of said sensor signal becomes one of: higher than 1/2 times the sampling frequency and lower than the sampling frequency; and higher than the sampling frequency and lower than 3/2 times the sampling frequency;
    demodulation calculation means for calculating a result based upon the sensor signal converted to said digital value; and
    control means for controlling said excitation amplifier based on the calculation result of said demodulation calculation means.

2. The magnetic bearing device according to claim 1, wherein said sampling frequency is set to 4/3 times or 4/5 times the frequency of said carrier wave.

3. The magnetic bearing device according to claim 1, wherein said demodulation calculation means includes:
    a sine wave discrete value generation part for generating a sine wave discrete value by digital calculation processing;
    a multiplication part for multiplying the sensor signal converted to said digital value and said sine wave discrete value; and
    a low-pass calculation part for performing low-pass calculation processing on the multiplication result of said multiplication part; and
    wherein said control means controls said excitation amplifier based on the calculation result of said low-pass calculation part.

4. The magnetic bearing device according to claim 3, wherein said carrier wave generation means includes:
    a phase shift calculation part for phase shifting said sine wave discrete value by digital calculation processing such that said sine wave discrete value multiplied by said multiplication part, and the sensor signal converted to said digital value, are substantially a same phase; and
    a D/A conversion part for D/A converting that phase shifted sine wave discrete value to generate said carrier wave.

5. The magnetic bearing device according to claim 1, wherein said carrier wave generation means comprises:

a sine wave discrete value generation part for generating a sine wave discrete value by digital calculation processing, and a D/A conversion part for D/A converting said sine wave discrete value to said carrier wave.

6. The magnetic bearing device according to claim 5, wherein said demodulation calculation means comprises:

a phase shift calculation part for phase shifting said sine wave discrete value by digital calculation processing such that said sine wave discrete value and the sensor signal converted to said digital value become substantially a same phase;

a multiplication part for multiplying the sine wave discrete value phase shifted by said phase shift calculation part and the sensor signal converted to said digital value; and a low-pass calculation part for performing low-pass calculation processing on a multiplication result of said multiplication part; and wherein said control means controls said excitation amplifier based on a calculation result of said low-pass calculation part.

* * * * *